Feb. 6, 1968

D. H. REED ET AL 3,368,075

CHLORINE LOGGING SYSTEM COMPRISING DETECTING 5.0 TO 6.5 MEV. GAMMA RAYS

Original Filed March 30, 1962

INVENTORS
Dale H. Reed
Henry F. Dunlap
Thomas S. Hutchinson
Robert E. McCallum
William C. Pritchett BY Charles F. Steininger
Attorney

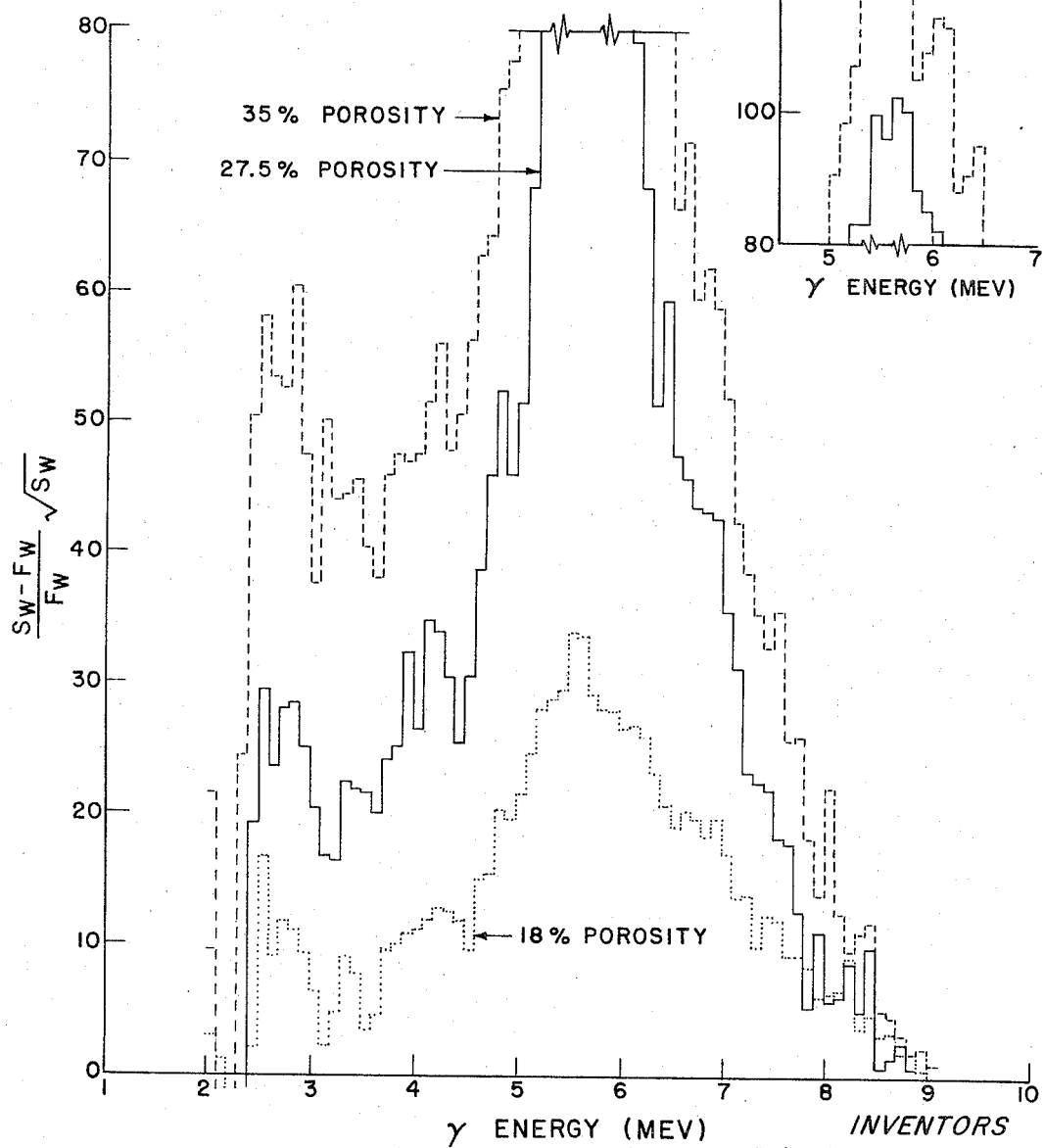

INVENTORS
Dale H. Reed
Henry F. Dunlap
Thomas S. Hutchinson
Robert E. McCallum
William C. Pritchett BY Charles F. Steininger
Attorney INVENTORS
Dale H. Reed
Henry F. Dunlap
Thomas S. Hutchinson
Robert E. McCallum
William C. Pritchett BY Charles F. Steininger
Attorney Feb. 6, 1968

D. H. REED ET AL
CHLORINE LOGGING SYSTEM COMPRISING
DETECTING 5.0 TO 6.5 MEV.
GAMMA RAYS 3,368,075

Original Filed March 30, 1962

INVENTORS
Dale H. Reed
Henry F. Dunlap
Thomas S. Hutchinson
Robert E. McCallum
William C. Pritchett BY Charles F. Steininger
Attorney Feb. 6, 1968

D. H. REED ET AL  
CHLORINE LOGGING SYSTEM COMPRISING  
DETECTING 5.0 TO 6.5 MEV.  
GAMMA RAYS 3,368,075

Original Filed March 30, 1962

INVENTORS  
Dale H. Reed  
Henry F. Dunlap  
Thomas S. Hutchinson  
Robert E. McCallum  
William C. Pritchett BY Charles F. Steininger Attorney INVENTORS
Dale H. Reed
Henry F. Dunlap
Thomas S. Hutchinson
Robert E. McCallum
William C. Pritchett BY Charles F. Steininger
Attorney

United States Patent Office 3,368,075
Patented Feb. 6, 1968

3,368,075
CHLORINE LOGGING SYSTEM COMPRISING DETECTING 5.0 TO 6.5 MEV. GAMMA RAYS
Dale H. Reed, Henry F. Dunlap, and Thomas S. Hutchinson, Dallas, Robert E. McCallum, Irving, and William C. Pritchett, Dallas, Tex., assignors to The Atlantic Refining Company, Philadelphia, Pa., a corporation of Pennsylvania
Continuation of application Ser. No. 183,960, Mar. 30, 1962. This application Aug. 4, 1965, Ser. No. 480,239
9 Claims. (Cl. 250—83.3)

This invention is a continuation of application Ser. No. 183,960, filed Mar. 30, 1962, and now abandoned.

The present invention relates to an improved chlorine logging system. More specifically, the invention relates to a downhole electronic system designed to scan the portion of the prompt capture gamma ray spectrum most sensitive to chlorine and to simultaneously scan a portion of the spectrum dependent on hydrogen content so that signals produced therefrom may be combined downhole and telemetered uphole on a single conductor with a minimum of circuitry and power. Most specifically, the invention relates to the critical portion of the spectrum in chlorine logging operations and to an improved pulse height analyzer for scanning the detected prompt capture gamma rays.

Basically, the chlorine log is produced by bombarding a subsurface formation with fast neutrons and measuring the formation's response in terms of prompt gamma rays of capture in a given energy range. Formation fluids, well bore fluids and certain elements in the formation moderate the fast neutrons until they reach thermal energy. At this energy, the neutrons are subject to capture by various atoms making up the formation. As a result of such captures, gamma rays are emitted and their energies are characteristic of formation elements performing the captures. Therefore, since chlorine is a principal capturer because of its large thermal neutron capture cross section, the formation's chlorine content can be determined by logging the count rate of gamma rays with energies characteristic of chlorine. This chlorine content together with a conventional hydrogen content (neutron) curve, recorded separately or simultaneously, are conventionally referred to as a chlorine log, since the hydrogen content or neutron curve is diagnostic of formation porosity and the chlorine curve is diagnostic of chlorine content, the log can be used to determine if porous formations contain salt water. That is, if the neutron curve registers a porous formation and the chlorine curve registers a small gamma ray count in the energy range most affected by chlorine, then the formation apparently contains hydrogen (water or oil) but little salt. If the depth of the formation rules out the presence of fresh water, oil is indicated.

Although chlorine logging is not restricted in its operation, it is particularly well suited to locating new producing formations during workover operations or in wells located in depleted reservoirs. In most instances, reservoirs nearing depletion are located in old producing areas where original unsophisticated well logs and other data are inadequate or have been lost or destroyed. Prior to the advent of the chlorine log, the wells in such areas were usually shut-in and abandoned since the producing casing prevented the use of electrical or sonic logs to aid in locating valuable new producing formations.

Although the chlorine log shows great potential in locating new producing formations in cased boreholes, many serious problems still confront the present state of the art. Some of these problems include:

(1) The over-all log is by nature limited to shallow depths of investigation and therefore borehole effects seriously interfere with count rate. Some of the more serious borehole conditions include iron casing end casing centralizers, borehole fluid, non-uniform cement jobs, variation of borehole size with change in depth, variation of drilling fluid depth of invasion, variation in position of sonde with formation logged which in turn is dependent on variation of position of casing within a borehole.

(2) The log is continually faced with changes in the chemical composition of formations. This can be one of the most serious problems and frequently produces curves misleading or ambiguous in nature, As an example, shale or shaly streaks in sand can falsely indicate salt water as an oil shale. In formations where limestone grades into dolomite or where cement behind casing is not uniform a log response is obtained which can erroneously be interpreted as oil.

(3) Gas-bearing formations may often be difficult to differentiate from tight salt water sands.

(4) The source and detectors utilized by the log introduce statistical variations.

(5) Gamma ray emission peaks from silicon in sand, aluminum in shale, calcium in limestones and dolomite, iron in well casing, calcium in cement jobs, give emission peaks in the same energy ranges as chlorine.

To fully appreciate the varying effects these problems can have on locating petroliferous deposits with a chlorine log it is necessary to understand how subsurface geological formations can vary throughout different parts of the country. As an example, "soft-rock" country such as the lower Gulf Coast and "hard-rock" country such as West Texas are areas containing oil-producing formations and other subsurface formations that differ greatly in their chemical and physical characteristics.

The lower Gulf Coast contains a weathered layer of heavy soils and a relatively shallow water table. The subsurface formations are generally a series of soft shales with poorly consolidated sandstones.

The West Texas area contains a weathered layer in which caliche is common and the water table is relatively deep. The subsurface formations are a series of shales, limestone, dolomite and evaporites with indurated sandstone. These rocks are older, denser and harder than the equivalent types of rocks in the lower Gulf Coast and therefore are, as a rule, less porous.

In the limestone reservoirs and even in the indurated sandstone reservoirs in West Texas the difference between salt water and oil is less discernible than in the Gulf Coast area. This is due primarily to the decrease in porosity and the resulting decrease in chlorine in the West Texas reservoirs. In other words, in West Texas reservoirs the difference between salt and fresh water on the chlorine curve is evidenced by a smaller difference in relative count rate between the chlorine and hydrogen responses for a given salinity.

With the above differences in mind, let us now examine the enumerated problems faced by the chlorine logging operation and see how they vary from soft-rock areas to hard-rock areas.

(1) If formation fluid redistribution is allowed before logging operations are conducted, borehole conditions are approximately the same in both soft- and hard-rock country. The response of the tool to these conditions depends on formation conditions that vary in soft- and hard-rock areas.

(2) The problems caused by formations changing chemical compositions are generally aggravated in hard-rock country. That is, the response to chemical changes super-imposed on the reduced response to salinity changes in hardrock country aggravates the problem of detecting hydrocarbons. In the case of limestone grading into dolomite, the reduced calcium content in dolomite reduces the number of neutron captures by calcium. Since many of the calcium gamma rays are in the chlorine gamma range, dolomitization thus produces a false indication of an oil-bearing formation. The presence of shale in any type of structural formation produces a lower count rate giving a false count rate reading to a formation actually containing salt water. That is, the presence of hydrogen with little salt in the shale increases neutron moderation and therefore decreases the amount of gamma rays actually reaching the detector. The chlorine count is particularly decreased. In the less porous formations, the above-described smaller difference between salt water and oil further emphasizes the false indication produced by shale.

(3) The presence of gas in any type of producing formation often produces an indication deceptively close to an indication produced by the presence of salt water in tight or low porosity sand. That is, the greatly reduced hydrogen content in the gas (as compared to given volumes of water or oil) reduces neutron moderation thereby producing higher count rates on the hydrogen and on the chlorine curves. In a tight salt water zone the low hydrogen content can yield an identical high count rate on the hydrogen curve and a near identical count rate on the chlorine curve. Therefore, in limestone reservoirs of the hard-rock country, the anomalously high response due to calcium makes the detection of any difference between the two more difficult.

(4) Statistical errors introduced by variations in the source are more serious for the low count rates measured in high porosity formations and therefore more serious in soft-rock country than in hard-rock country.

(5) Interfering gamma ray emission peaks from elements other than chlorine increase as the logging operations are moved to hard-rock country. The difficulty stems mainly from the considerable overlap of the calcium spectrum and the chlorine spectrum, calcium being a more serious problem than the silicon in soft-rock country. Calcium is considerably more prevalent in West Texas than in the Gulf Coast. Sulfur, gypsum and magnesium are also troublesome and are more prevalent in West Texas.

The chlorine logging method has been practiced in various ways in an attempt to successfully distinguish between salt water and oil under varying conditions such as described above. However, to the best of applicants' knowledge, there is no tool or method presently available that can actually operate satisfactorily except under the most favorable borehole conditions, i.e., in shale-free sands of high porosity with high salinity formation waters.

Even under these favorable conditions the operation of the present-day tools does not always give strong indications of hydrocarbon-bearing formations.

The present state of the art offers conflicting evidence as to what portion of the prompt capture gamma ray energy spectrum is most informative for chlorine logging purposes. U.S. Patent Re. 24,383 discusses identifying chlorine content by recording gamma rays of capture with energies on the order of 8 or even 9 mev. U.S. Patents 2,830,185 and 2,949,535 record gamma ray energies of capture in the neighborhood of 7 mev. and then define the term "neighborhood" by stating a range of above about 3 mev. and below 10 mev.

Accordingly, it is an object of the invention to provide an improved method and means for conducting chlorine logging operations whereby salt water can be distinguished from fresh water under varying conditions.

Another object of the present invention is to provide the critical energy window for viewing the prompt capture gamma ray energy spectrum during chlorine logging operations.

Another object of this invention is to provide an improved pulse height analyzer for a chlorine logging sonde.

Another object of this invention is to provide an improved pulse height analyzer adapted to more accurately represent chlorine content of a subsurface formation.

Another object of this invention is to provide a simplified pulse height analyzer adapted to reduce power consumption and improve operational reliability.

Another object of this invention is to provide an improved pulse height analyzer designed to simplify telemetering by allowing at least two logs to be transmitted uphole in terms of single polarity pulses that convey information by amplitude variation.

Other and further objects of the instant invention will be apparent from the following detailed description of the present invention.

The general arrangements and the other objects of the invention may be more readily determined by referring to the drawings wherein:

FIGURES 1b–1f show plots of relative chlorine sensitivity versus energy in million electron volts as borehole and formation conditions change.

Briefly described, the invention contemplates a chlorine logging operation utilizing a critical window width to scan the prompt capture gamma ray energy spectrum so as to overcome the prior art disadvantages as well as the problems confronting chlorine logging as discovered by applicants. The invention further contemplates the use of a novel and simplified pulse height analyzer designed to pass prompt capture gamma ray energy in the critical 5 to 6.5 mev. range or in the mev. range desired. The pulse height analyzer simplifies the telemetering problem by using single polarity pulses to transmit a neutron and chlorine log uphole in terms of amplitude variations.

Applicants have conducted extensive research and experimentation in an attempt to produce a chlorine logging method and apparatus that can operate successfully and dependably regardless of formation and borehole conditions. As a result of these activities, applicants have discovered the critical portion of the prompt capture gamma ray energy spectrum which is most sensitive to chlorine and is contrary to the prior art teachings. Use of this portion of the spectrum unexpectedly overcomes recognized chlorine logging problems as well as certain other problems which applicants have discovered as serious obstacles to the operation of the prior art. In order to substantiate that this portion of the spectrum is critical and achieves significant improvements under varying conditions, approximately 150 different experimental runs were made with reservoir and borehole conditions varying from typical to extreme. The porosity of the reservoir (sand) was varied from 18 to 35 percent, the size of the casing was varied from 5.5 to 7 inches, the weight of the 5.5 inch casing was varied from 14 to 20 pounds, the annulus material was varied from cement to mud, the position of the casing with respect to the borehole was varied from centralized to eccentric, and the fluid in the casing was varied from fresh water to salt water to air.

To better appreciate the significant improvements achieved by viewing the new portion of the spectrum, a typical range of sand reservoir and borehole conditions used in the substantiation runs and found in a typical Gulf Coast area is included for purposes of illustration. These reservoir conditions were logged with fresh water (3,100 p.p.m. NaCl) and with salt water (180,000 and 90,000 p.p.m. NaCl) as the reservoir fluid. For purposes of simplicity, the term salt water, unless otherwise qualified, denotes water with salt content of 180,000 p.p.m. In logging each model representing a given set of reservoir and borehole conditions, initial data was obtained by plotting the logarithm of counts per ten minutes in each .05 mev. increment versus energy in million electron volts.

Figure 1A:
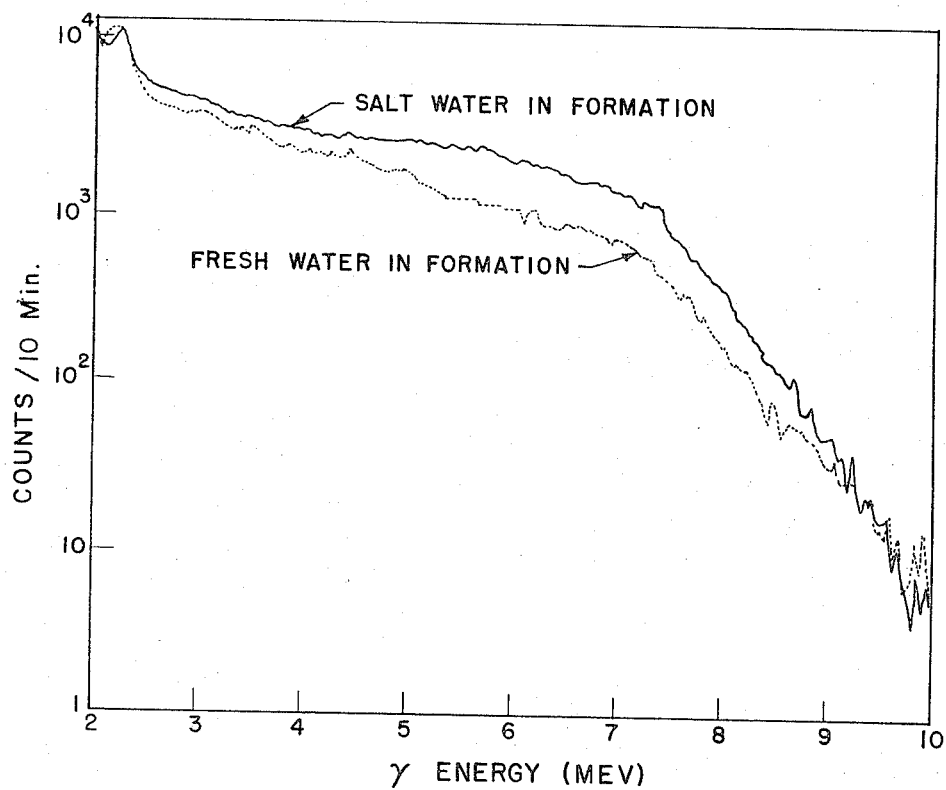
FIGURE 1a shows prompt capture gamma ray energy response curves with salt water and fresh water in a typical sand reservoir where the logarithm of counts per ten minutes in each .05 mev. increment is plotted versus energy in million electron volts.

FIGURE 1a shows response curves with salt water and fresh water in a sand reservoir of 27.5 percent porosity and with borehole conditions including a 5.5 inch, 14 pound casing, mud in the annulus and salt water in the casing. The difference between the response of salt water and fresh water is clearly shown between 2.5 mev. and 9.5 mev. However, the critical energy window, i.e., the window most sensitive to the chlorine and least affected by borehole conditions, etc., cannot be determined from this curve since errors introduced by count rate variations, salinity variations, and changing borehole and reservoir conditions are not shown. Applicants have found that these errors and changing conditions prevent the prior art windows from producing satisfactory chlorine logs in all but the most ideal conditions described heretofore.

To accurately portray the effects of these errors and changing conditions and to demonstrate how applicants' window is less affected by same, the graphs to be used hereinafter plot relative sensitivity to chlorine versus energy in million electron volts instead of the logarithm of counts per given time versus million electron volts. By plotting relative sensitivity to chlorine, both the change in count rate and the magnitude of the rate are considered so as to compensate for the effects of statistical variations in count rates that are present. Put in another way, the relative sensitivity is a measure of the percent change in count rate between the response of salt water and fresh water weighted by a factor indicative of the magnitude and the statistical accuracy of the count rate. Therefore, this relationship is the true expression of the difference between fresh water and salt water in the formation. Relative chlorine sensitivity can be expressed by the formula:

$$R_S = \frac{S_w - F_w}{F_w} \sqrt{S_w}$$

$R_S$ is relative sensitivity. $S_w$ is the count rate in each energy increment per unit time with salt water as the formation fluid and $F_w$ is the count rate in each energy increment per unit time with fresh water as the formation fluid. In the formula $$\frac{S_w - F_w}{F_w}$$

is an expression to show percent change and $\sqrt{S_w}$ is a conventional expression to compensate for statistical variations in the count rate. See AEC Manuscript (AECU-262) entitled, Statistical Methods Used in the Measurement of Radioactivity, by Alan A. Jarrett, dated June 17, 1946, page 15.

Let us now consider the relative chlorine sensitivity as defined above when at least one of the reservoir or borehole conditions is varied. FIGURE 1b presents plots of relative chlorine sensitivity versus energy in million electron volts for a given set of borehole conditions with a give formation fluid salinity content when the formation porosity is varied from 18 to 27.5 to 35 percent. The borehole conditions include 5.5 inch, 14 pounds casing with mud in the annulus and salt water in the casing. The curves in FIGURE 1b show that changes of sensitivity with porosity are prevalent throughout the spectrum but that the greatest chlorine sensitivity is found in the neighborhood of 5.5 to 5.7 mev.; however, this very narrow window is not satisfactory since it gives such a low total count rate. Applicants have unexpectedly found that the critical energy range of 5 to 6.5 mev. not only reduces statistical variations; it minimizes the effects produced by changing borehole conditions, and is most sensitive to the presence of chlorine regardless of porosity. The chlorine logs produced by this energy range have been compared with and found superior to logs produced by other prior art devices using the various prior art energy ranges.

The criticality of the 5 to 6.5 mev. portion of the spectrum is demonstrated by the following curves which show relative chlorine sensitivity under various changing conditions normally found in the field. These curves show that there is substantially more sensitivity to chlorine in the 5 to 6.5 mev. energy range than is found above or below this energy range.

Figure 1C:
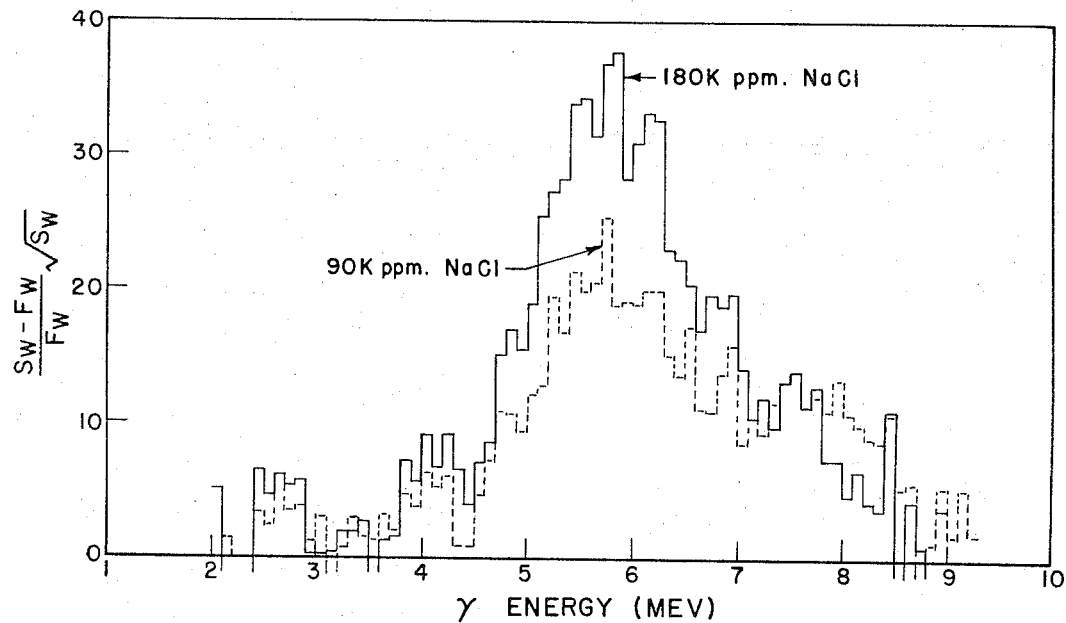

FIGURE 1c presents plots of relative chlorine sensitivity versus energy in million electron volts when the formation fluid salinity is varied from 180,000 to 90,000 p.p.m. with the formation porosity 18 percent and the remaining conditions as described for FIGURE 1b above. The two curves clearly show that with various salinities the 5 to 6.5 mev. energy range is most sensitive to salt water. A comparison of the two curves shows clearly that changes in formation salinity are most readily detected by the 5 to 6.5 mev. window.

Figure 1D:
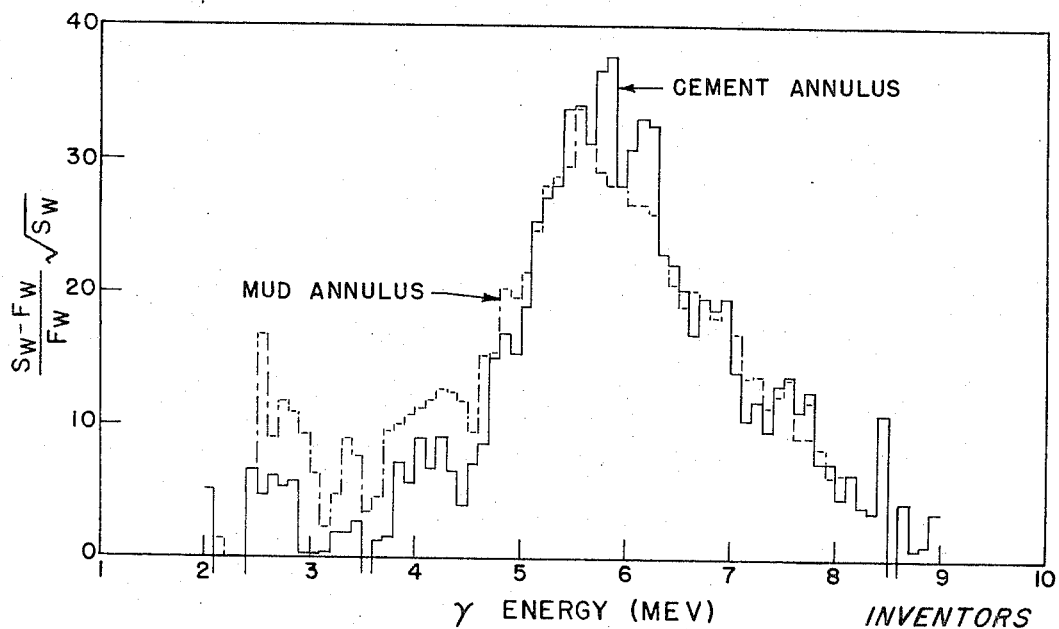

FIGURE 1d presents plots of relative chlorine sensitivity versus energy in million electron volts when the annulus material is changed from cement to mud with the formation porosity 18 percent and the remaining conditions as described for FIGURE 1b. The calcium in the cement accounts for changes in sensitivity; however, it should be noted that sensitivity is roughly the same in the window range from 5 to 6.5 mev.

Figure 1E:
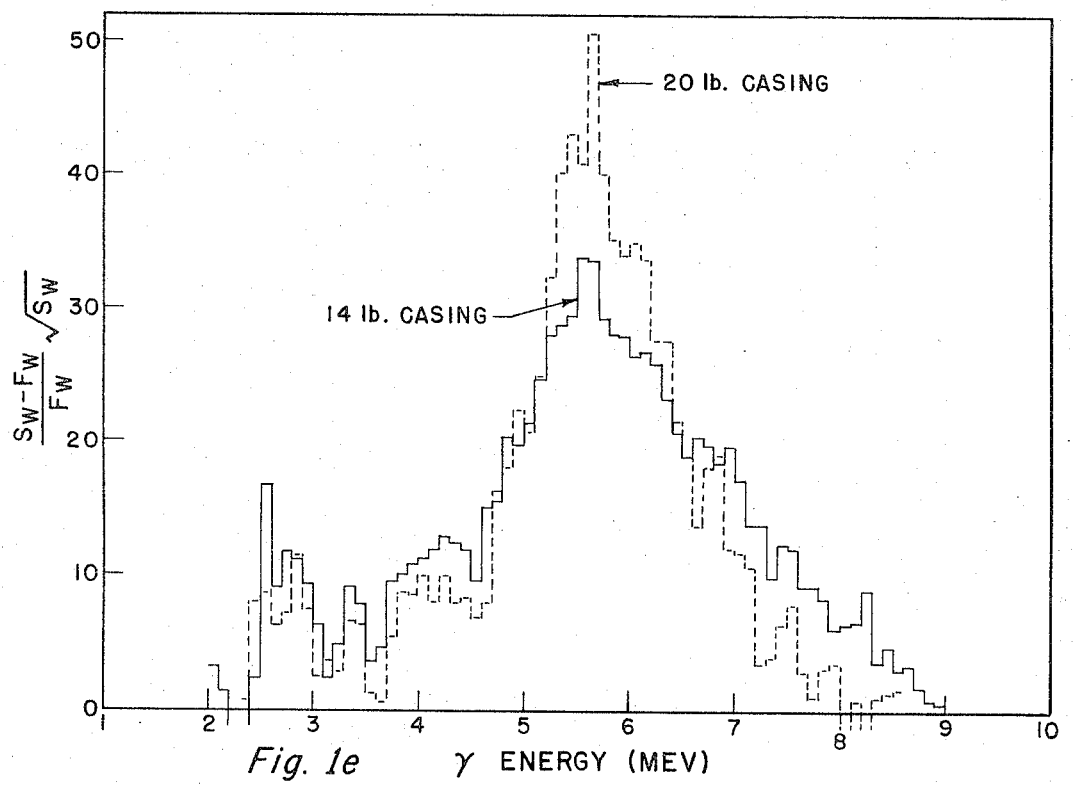

FIGURE 1e presents plots of relative chlorine sensitivity versus energy in million electron volts when the casing changes from 20 pounds to 14 pounds per foot with the formation porosity 18 percent and the other conditions as described for FIGURE 1b. This figure clearly shows that the chlorine sensitivity is reduced when casing weight is changed from 20 pounds to 14 pounds per foot; however, the 5.0 to 6.5 mev. window, in both cases, remains more sensitive to chlorine than the prior art windows.

Figure 1F:
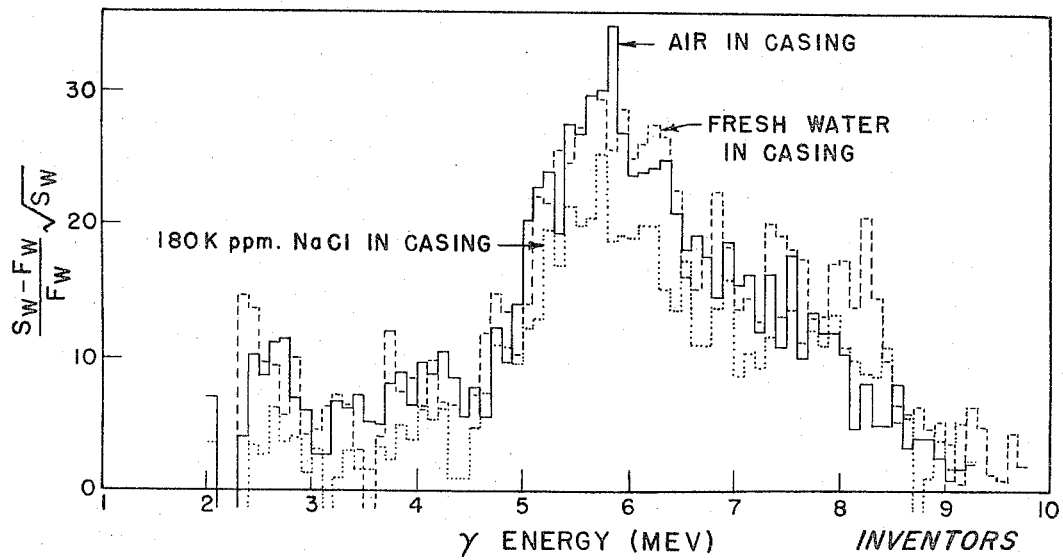

FIGURE 1f shows plots of relative chlorine sensitivity versus energy in million electron volts when the fluid in the casing is changed from salt water to fresh water to air with the formation porosity 18 percent, the formation fluid salinity 90,000 p.p.m., cement in the annulus and the remaining conditions as described in FIGURE 1b. This figure clearly shows that regardless of the fluid in the casing, the sensitivity peak remains in the 5.0 to 6.5 mev. window and not in the prior art windows.

In summary, the information contained in the figures above and found in the numerous experimental runs discussed heretofore clearly supports the criticality of the 5 to 6.5 mev. energy range. While under a specific set of conditions a very narrow energy range may exhibit a higher chlorine sensitivity, its position will vary with conditions and it is always subject to large statistical errors. The critical limits of the 5 to 6.5 mev. range include the highest chlorine sensitivity regardless of the conditions and are wide enough to materially reduce statistical variations.

It has been found that the relative sensitivity to chlorine relationship, discussed in connection with the figures above, can be used in a method of chlorine logging. To be more specific, in a chlorine logging operation where an interval of a logged borehole is selected on the basis that it contains uniform borehole conditions, the method includes the steps of, (a) in the selected interval, obtaining the best match of measured data with laboratory determined data to obtain borehole and formation conditions at the selected interval, (b) running a full prompt capture gamma ray spectrum at a zone of interest within the selected interval, and (c) plotting relative chlorine sensitivity using data obtained from steps (a) and (b). Presence of salt water in the zone of interest will cause a characteristic peak in the plotted curve. Deviations from this characteristic peak may be used to detect unexpected formation characteristics in the zone of interest.

Figure 2:
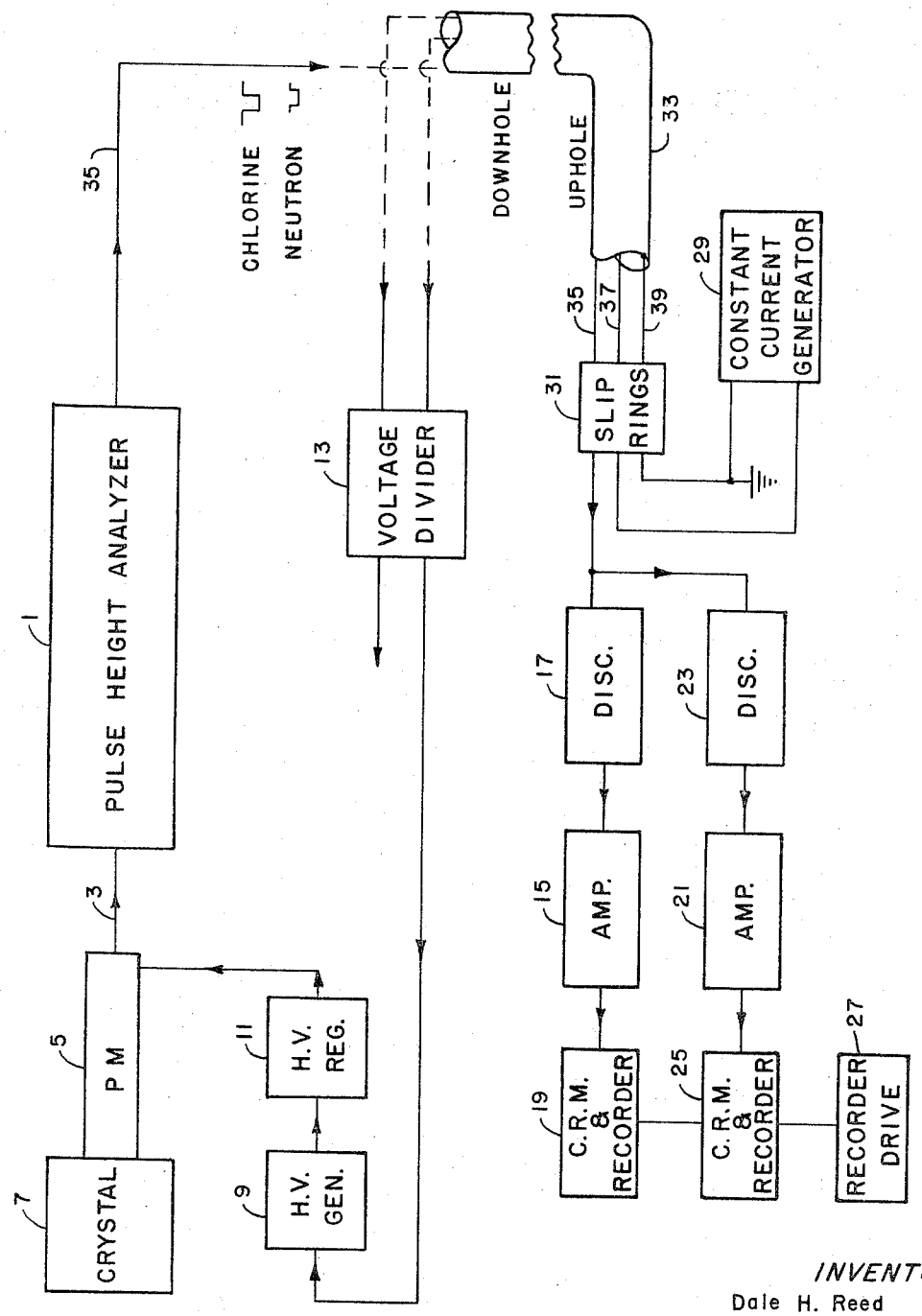
FIGURE 2 shows a block diagram of a logging instrument suitable for carrying out applicants' invention.

Consider now devices for practicing the invention. FIGURE 2 discloses a block diagram of a logging system capable of practicing applicants' improved chlorine logging operation. Although the over-all invention can be practiced with various combinations of conventional components, it is preferable to employ the invention with the component combination shown in FIGURE 2. The downhole components shown in FIGURE 2 include a novel pulse height analyzer circuit 1 electrically connected by representative conductor 3 to a conventional photomultiplier tube 5. Tube 5 views scintillation crystal 7 and is powered by high voltage generator 9 and regulator 11. Voltage divider system 13 is connected to high voltage generator 9 and to other conventional low voltage elements not shown for purposes of simplification. The uphole conventional components of the system include amplifier 15 connected between discriminator 17 and count rate meter and recorder 19 and amplifier 21 connected between discriminator 23 and count rate meter and recorder 25. The recorders are driven by a single recorder drive 27. Constant current generator 29 and discriminators 17 and 23 are shown connected to slip rings 31. Multiconductor cable 33 contains conductor 35 connecting discriminators 17 and 23 to pulse height analyzer 1. Conductors 37 and 39 are connected between generator 29 and voltage divider 13. If desired, conductor 39 can be connected through the shield of cable 33 as shown. Cable 33 may be wound or unwound from a conventional logging drum (not shown) to raise or lower the logging sonde (not shown) containing the downhole components shown in FIGURE 2.

Figure 3:
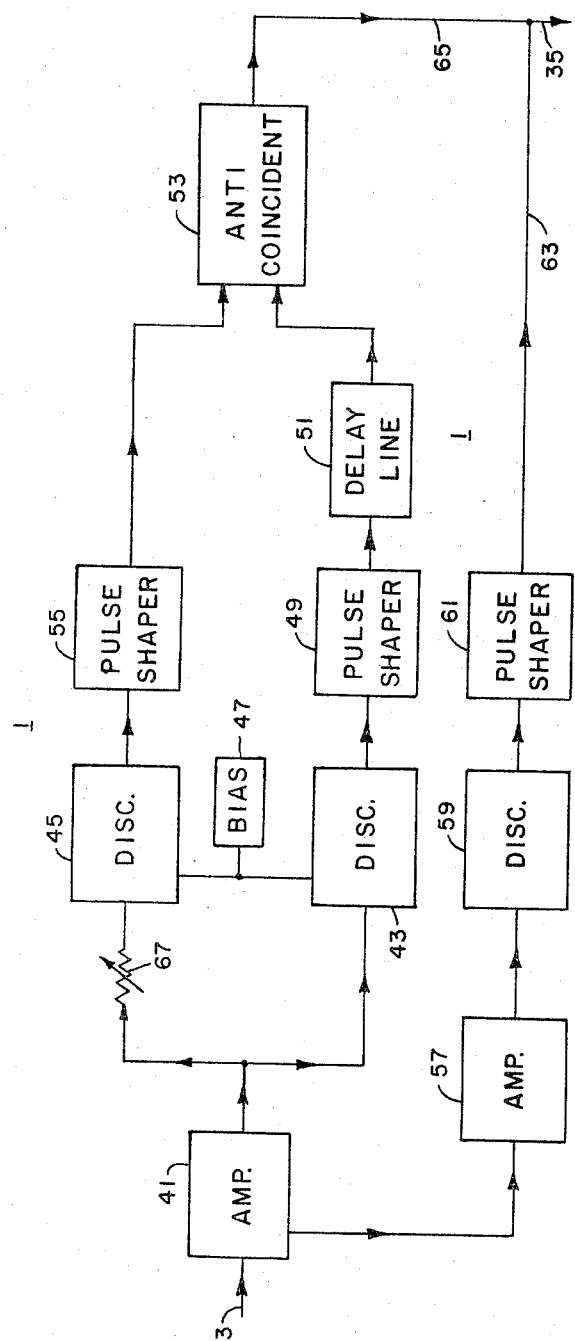
FIGURE 3 shows a block diagram of the novel pulse height analyzer.

FIGURE 3 shows a block diagram of the novel pulse height analyzer 1 shown in FIGURE 2. Pulse height analyzer 1 includes a high energy gamma (chlorine) signal differential discriminator section and a low energy gamma (neutron) signal discriminator section. The chlorine signal discriminator section includes amplifier 41 connected in parallel to discriminators 43 and 45, bias source 47 connected in parallel to discriminator 43 and discriminator 45, discriminator 43 connected serially to pulse shaper 49, delay line 51 and anticoincident circuit 53 and discriminator 45 serially connected to pulse shaper 55 and anticoincident circuit 53. The neutron signal discriminator section includes amplifier 57 serially connected to discriminator 59 and pulse shaper 61. Output conductor 63 from 61 and output conductor 65 from 53 are connected in parallel to conductor 35 in cable 33. Pulse height analyzer input 3 is shown connected through a portion of block 41 to amplifier 57. However, if desired, input 3 can be connected in parallel to 41 and 57. Since, for purposes to be discussed hereinafter, it is desirable to utilize different amplification factors in amplifiers 41 and 57, the preferred embodiment, FIGURE 5a, connects pulse height analyzer input 3 through amplifier 41's initial emitter follower stage to amplifier 57. Rheostat 67 can be utilized as shown or incorporated in discriminator circuit 45. This rheostat is utilized in conjunction with the gain of amplifier 41 and the design value of bias 47 to determine the upper voltage limit for the chlorine spectrum. The lower threshold voltage is determined by the gain of amplifier 41 and bias 47. The lower threshold voltage for the neutron spectrum is determined by a bias source within discriminator circuit 59 and the gain of amplifier 57.

In operation, amplifier 41 receives voltage pulses on input 3 from photomultiplier tube 5, FIGURE 2, and passes these pulses representing various prompt capture gamma ray energies to the chlorine signal discriminator circuit and to amplifier 57. As will be explained in detail hereinafter, threshold voltage of discriminator 43 is set to pass pulses representing energies of 5 mev. or more while the threshold voltage of discriminator 45 is set to pass pulses representing energies of 6.5 mev. or more. The threshold voltage of discriminator 59 is set to pass pulses representing energies of 2 mev. or more. If a pulse representative of a 6 mev. prompt capture gamma ray is received by amplifier 41, the pulse is simultaneously applied to discriminators 43, 45 and through amplifier 57 to discriminator 59. Because of the predetermined threshold voltages, discriminators 43 and 59 pass the pulse and discriminator 45 does not pass it. Pulse shaper 49 receives 43's output and amplifies it to a predetermined amplitude after which it is delayed by delay line 51 and applied to the input of anticoincident circuit 53. With only one pulse arriving at 53 the pulse is passed through the anticoincident circuit to output 65 as a negative going pulse of predetermined amplitude. See the chlorine pulse, FIGURE 2. A pulse representing the same gamma ray is simultaneously passed through discriminator 59 and pulse shaper 61 where it is amplified to a predetermined amplitude (one-half the amplitude of the pulse from 53). See neutron pulse, FIGURE 2. These two pulses of different amplitudes but representing the same energy are combined and sent uphole on conductor 35. Uphole, the combined, large amplitude pulse is passed by discriminators 17 and 23, FIGURE 2, and recorded as part of the chlorine curve by recorder 19 and as part of a neutron curve by recorder 25. Discriminator 17 is biased to pass only large amplitude pulses while discriminator 23 is biased to accept the small amplitude pulses from 61, FIGURE 3, and the large amplitude pulses from 53.

If amplifier 41 receives a pulse representing slightly more than 6.5 mev., the pulse is passed by all of the downhole discriminators. The pulse passed by discriminator 45 is amplified to a predetermined amplitude and width by 55 and applied to the input of anticoincident circuit 53. The pulse passed through discriminator 43 is amplified to about the same predetermined amplitude but of opposite polarity and delayed by 51 so that it arrives at the input of 53 slightly after the leading edge of the pulse from 55. Since both pulses arrive at 53 at approximately the same time, no output is produced on conductor 65; however, a small amplitude pulse does appear on conductor 63 and is sent uphole on conductor 35. This pulse is produced by the original pulse passing through amplifier 57, discriminator 59 and pulse shaper 61. Since this is a small amplitude pulse, it is rejected by discriminator 17, FIGURE 2, but passed by discriminator 23 and recorded as part of the neutron curve by recorder 25. From the above, it is clear that pulses representing energy between 5.0 mev. and 6.5 mev. appear on conductor 65 as a negative going pulse of a predetermined amplitude and pulses representative of 2.0 mev. and above appear on conductor 63 as negative going pulses one-half the amplitude of the first pulse. If both pulses appear they are combined on conductor 35 as a single large amplitude pulse.

It should be understood that the novel pulse height analyzer can be instrumented by vacuum tubes or by transistors. Since the pulse height analyzer is utilized downhole, the preferred embodiment shown in FIGURE 5 utilizes transistors to make the circuit more shock-resistant and to reduce power consumption and space requirements. Since these features are not of great importance in the uphole circuit, either tubes or transistors can be used.

Figure 4:
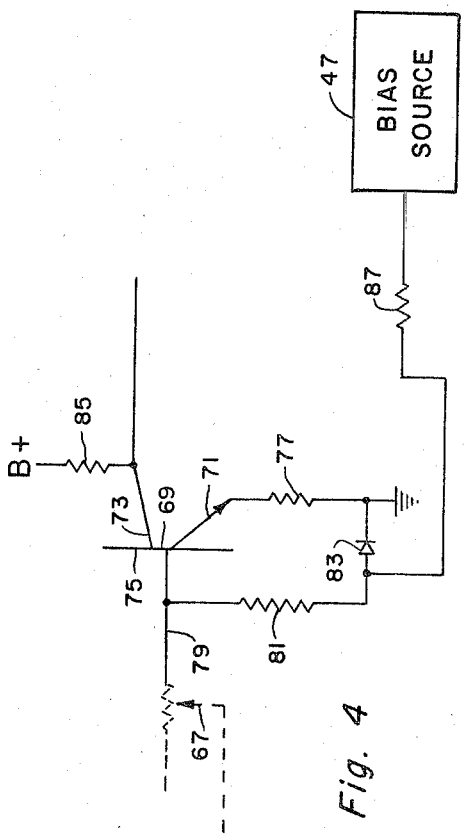
FIGURE 4 shows a circuit diagram of the preferred embodiment of the discriminators used in FIGURE 3.

FIGURE 4 discloses the preferred embodiment of the special discriminators utilized in pulse height analyzer 1, FIGURE 3. The discriminator includes transistor 69 with emitter 71, collector 73 and base 75. Emitter resistor 77 is connected between 71 and ground. Input conductor 79 is connected in parallel to base 75 and isolation resistor 81 which in turn is connected in parallel with Zener diode 83 to ground. Load resistor 85 is connected between B+ and 73. Bias voltage source 47 is connected through ballast resistor 87 to the anode of Zener diode 83.

By using the discriminators as arranged in FIGURE 3, the pulse height analyzer is able to operate directly on the photomultiplier output pulses without the requirement for stable high gain amplification. Since the photomultiplier tube's output voltages range from less than one volt to approximately four volts, most conventional discriminators used with the tube require stable high gain amplification and those that do not require such preamplification are much more complex than the discriminators shown. By using a back biased transistor-type amplifier stage with negative feedback, FIGURE 4, as a discriminator, low level discrimination is practiced and sufficient voltage gain is produced within the stage to maintain stable thresholds throughout the pulse height analyzer. Being more specific, the pulse shaping circuits 49, 55 and 61 following their respective discriminator circuits in FIGURE 3 commonly have a 0.1 volt variation in trigger level as a result of temperature changes that occur during downhole operations. Therefore, if only a 0.01 volt variation is allowed in the discriminator levels, it is necessary to amplify their input signals by a factor of 10 to insure that the allowable small signal variations passed by the discriminators have sufficient amplitude to overcome threshold variations encountered in the remaining portions of the pulse height analyzer that are sensitive to temperature variations. The improved and simplified discriminator shown in FIGURE 4 develops this necessary gain within the discriminator stage instead of resorting to the conventional solution of making a preceding amplifier (41 or 57, FIGURE 3) a complicated circuit designed to produce the necessary stable high gain amplification.

In operation, transistor 69 is normally biased to cut off by an accurate stable voltage developed by source 47. In the preferred embodiment, 47 is a constant current generator 29 and voltage divider 13, FIGURE 2, adapted to produce a negative 15 volts which is applied across ballast resistor 87 to the cathode of Zener diode 83. With the preferred parameter values shown in FIGURE 5a, a bias of approximately −6 volts is applied to transistor base 75. This bias voltage which can be varied as desired is the effective threshold voltage of the discriminator. As will be detailed in the calibration steps discussed hereinafter, preceding amplifier stage 41 or 57, FIGURE 3, is varied until its amplification factor causes the minimum desired voltage pulse to overcome this threshold voltage. Assuming that a 1.92 volt pulse represents a 5 mev. capture gamma ray, the amplification factor of 41 is varied until this pulse overcomes the −6 volt bias applied to base 75, FIGURE 4, and the portion exceeding 6 volts is passed. More specifically, let us assume that in the preferred embodiment the necessary amplification factor of 41 is approximately 3. This means that the 5 mev. energy represented as a voltage pulse of 1.92 must be amplified to a voltage or approximately 6.01 volts before it is passed through the discriminator. The pulse shaping circuit, such as 55, FIGURE 3, exhibits a .15 volt threshold voltage which is subject to .1 volt variation due to temperature changes. Therefore, to insure that the minimum (.01 volt) signals passed by the discriminator always trigger the pulse shaping circuit, it is necessary for the discriminator to amplify input signals by at least a factor of 10. This necessary amplification is developed according to the size of emitter resistor 77.

Figure 5A:
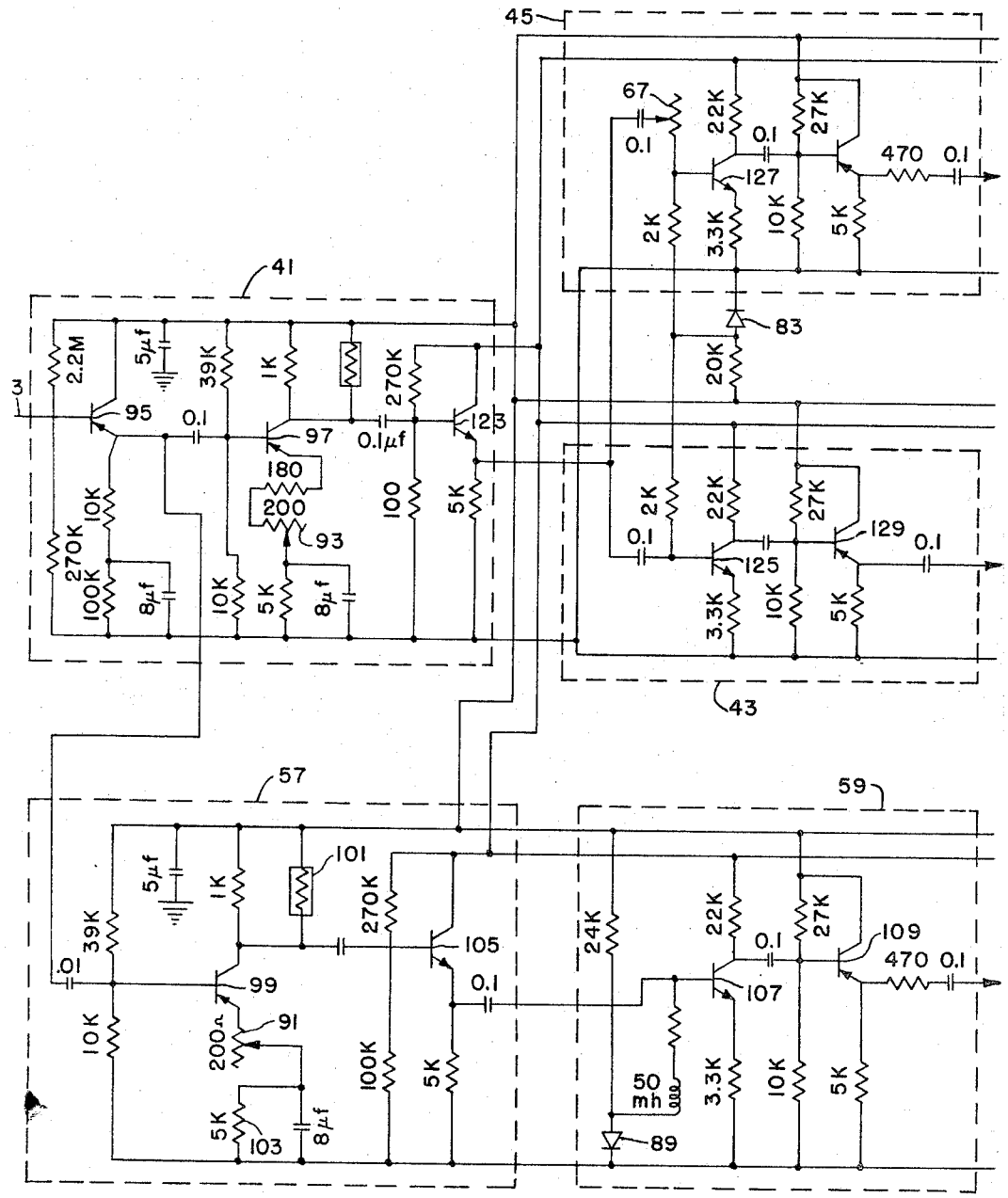
FIGURES 5a and 5b show the preferred embodiment of FIGURE 3.

If it is desirable to establish an upper voltage limit on the discriminator as in 45, FIGURE 5, an attenuating component such as variable resistor 67 shown in FIGURE 4 with dotted lines can be utilized. In the preferred embodiment shown in FIGURE 5a, variable resistor 67 is set to attenuate all undesired voltages so that only voltages above a predetermined level exceed the bias and are passed by the discriminator. If it is desirable to make the discriminator part of a circuit, such as shown in FIGURE 3, but capable of viewing various predetermined window widths, the bias applied to the base of the discriminator can be varied to the desired predetermined voltage. For instance, bias source 47, FIGURE 3, can be made to vary to the desired predetermined voltages. If it is undesirable to vary the voltage source a switch and a bank of parallel, different sized Zener diodes can be utilized. One example of the latter embodiment includes a rotary switch which selectively connects a Zener diode of a size to produce the necessary bias voltage on transistor base 75, FIGURE 4.

Figure 5B:
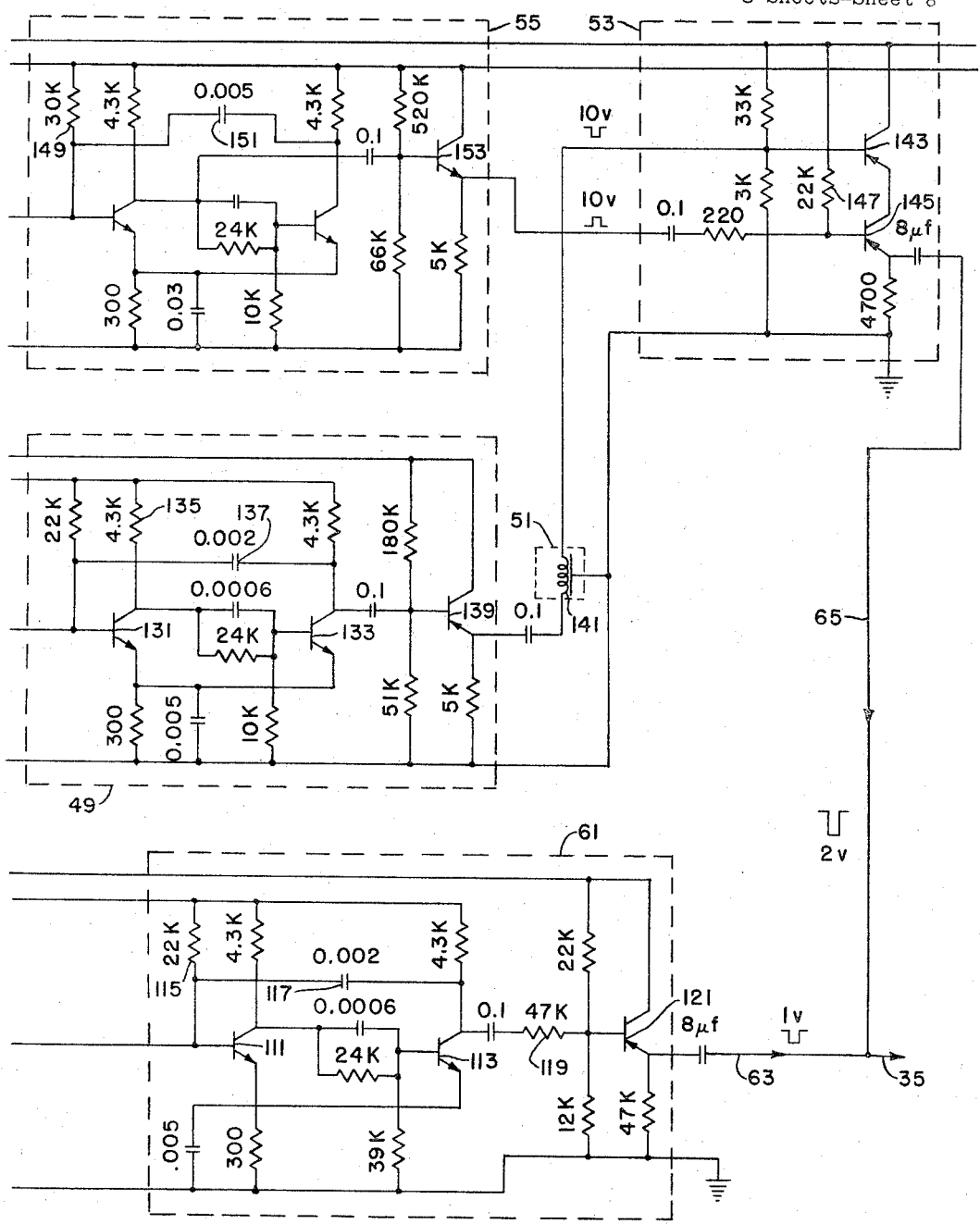

For a detailed discussion of the preferred embodiment of pulse height analyzer 1, FIGURE 3, using discriminators as shown in FIGURE 4, refer now to FIGURES 5a and 5b. FIGURES 5a and 5b show FIGURE 3 components in detail. Note that most of these components are coupled by conventional emitter follower stages for the usual impedance matching and isolation purposes. These emitter follower stages are included with their respective components in dashed blocks numbered to correspond with similar components in FIGURE 3. The FIGURES 5a and 5b embodiment of the pulse height analyzer passes the desired prompt capture gamma ray spectrum by using Zener diode 83 to develop the desired bias or lower threshold voltage for discriminator 43 and the upper voltage level for discriminator 45. Rheostat 67 is used to set the upper voltage level for discriminator 45 above 43. Zener diode 89 is used to develop the lower threshold level for discriminator 59. With this basic disclosure, it is believed that an understanding of the detailed description and operation of the embodiment can be facilitated by first describing calibration procedures which are necessary to insure accurate operation. Photomultipler tube 5 in FIGURE 2 and the discriminator circuits in FIGURE 5a must be calibrated before each logging operation. The photomultiplier tube is calibrated by placing a radium button of given strength at a predetermined location on the crystal and adjusting the photomulipler tube's anode resistor (not shown) until the tube output is .385 volt per mev. Therefore, if it is desirable to record prompt capture gamma ray energies between 5 and 6.5 mev. all pulses between 1.92 and 2.50 volts (peak) produced by the photomultiplier tube must be counted since energy-to-voltage conversion by the crystal photomultiplier operation is linear. To provide the pulse height analyzer with the stability of operation necessary to pass the pulses of interest, these original pulses are amplified by a suitable factor to allow the use of a stable threshold voltage in the discriminator circuits. Since the preferred embodiment of the pulse height analyzer in FIGURES 5a and 5b uses transistors, amplifier 41 amplifies the pulses by a factor of approximately 3 and amplifier 57 amplifies by a factor of approximately 8. Of course, other suitable factors can be used. A pulse generator is used to calibrate the pulse height analyzer. Since the predetermined bias voltages developed by Zener diodes 89 in the neutron signal discriminator and by Zener diode 83 in the chlorine signal discriminator are accurate and stable due to the action of constant current generator 29, FIGURE 2, only the gain of amplifiers 41 and 57 need be checked for low level discrimination and rheostat 67 need be checked for upper level discrimination. The pulse generator is connected to input 3, FIGURE 5, and a 0.77 volt pulse representing 2.0 mev. is developed. Potentiometer 91 in amplifier 57 is adjusted until the amplifier gain allows counting to start on the recorder 25, FIGURE 2. Next, a 1.92 volt pulse is developed and rheostat 93 in amplifier 41 is adjusted until the amplifier gain allows counting to start on recorder 19, FIGURE 2. Lastly, a 2.5 volt pulse is developed and rheostat 67 in discriminator 45 is adjusted until counting ceases on recorder 19.

For the purpose of illustrating the detailed operation of the embodiment in FIGURES 5a and 5b, let us assume that calibration is complete and that during logging operations the photomultiplier tube develops a negative going pulse of approximately 2.31 volts on conductor 3 from a prompt capture gamma ray energy of approximately 6 mev. This negative going pulse is passed through emitter follower transistor 95 in amplifier circuit 41 and is then applied simultaneously to the base of transistor 97 in amplifier circuit 41 and to the base of transistor 99 in amplifier circuit 57. Amplification in circuit 57 is temperature compensated by thermistor 101 and stabilized by negative feedback provided by emitter resistors 91 and 103. Although the gain of transistor amplifier 99 is approximately 8, the magnitude of the negative going 2.31 volt pulse causes 99 to conduct to saturation producing a positive going pulse of only 9 volts which is sent through emitter follower transistor 105 and onto the base of transistor 107 in discriminator circuit 59. Transistor 107 is biased to approximately −6 volts by a Zener diode 89 and the positive 9 volt pulse causes 107 to conduct developing a negative going pulse through emitter follower transistor 109. This negative going pulse is in excess of the approximately .15 threshold voltage necessary to trigger pulse shaping circuit 61. Circuit 61 is a unistable multivibrator made up of transistors 111 and 113 and their associated circuitry as shown. The negative pulse from 59 is applied to the base of transistor 111 cutting off 111 and turning on transistor 113. The negative going pulse produced from 113 is approximately 10 volts in amplitude and approximately 20 microseconds in width. The width of the pulse is determined by the value of resistor 115 and capacitor 117 in the multivibrator circuit.

It should be noted that after each pulse shaping stage in FIGURE 5b, the amplitudes of the pulses produced are no longer related to the gamma ray energies that originally produced the pulses. For instance, in the neutron circuit, all pulses produced by gamma ray energy of 2 mev. or more will leave circuit 61 as negative going pulses of equal amplitude and width. Of course, the polarity size and width are dependent on the circuit used. After leaving the pulse shaping circuit, the negative going 10 volt pulse produced by the preferred embodiment is attenuated to approximately one volt by resistor 119 and applied to the base of power amplifier transistor 121 after which it is sent through 63 to conductor 35.

The original negative going 2.31 volt pulse which was applied to the base of transistor 97 simultaneously with the pulse applied to transistor 99 will now be considered. Amplifier circuit 41 amplifies the pulse by a factor of approximately 3 thereby producing a positive going pulse of approximately 6.9 volts. Like transistor 99 in circuit 57, transistor 97 is stabilized by heavy emitter negative feedback action and thermistor temperature stabilization.

The positive going pulse from 97 is passed through emitter follower transistor 123 and simultaneously applied to the base of transistors 125 and 127 in discriminator circuits 43 and 45, respectively. However, the portion of the 6.9 volt pulse applied to transistor 127 is attenuated to less than 6 volts by variable resistor 67 at the base of transistor 127. Because of this attenuation the pulse does not pass through discriminator 45 since it does not exceed the 6 volt threshold bias applied to transistor 127 by Zener diode 83. The unattenuated approximately 6.9 volt pulse which is also applied to transistor 125 in discriminator 43 exceeds the 6 volt bias applied to transistor 125 by Zener diode 83. Therefore, transistor 125 conducts passing a positive going pulse through emitter follower transistor 129. This pulse exceeds the approximately .15 volt threshold voltage of pulse shaper circuit 49 causing transistor 131 to turn off and 133 to conduct. The negative pulse produced from this multivibrator action produces a negative going pulse of approximately 10 volts and a predetermined width set by the values of resistor 135 and capacitor 137. In this particular instrumentation, the width is equal to approximately 20 microseconds. The negative going pulse is passed through emitter follower transistor 139 and one microsecond delay line 141 to the base of transistor 143 in anticoincident circuit 53. Transistors 143 and 145 are in series. Transistor 145 is normally biased to conduction by resistor 147. Therefore, the negative going 10 volt signal applied to the base of 143 produces a negative going 2 volt output on conductor 65. The signal is reduced to 2 volts by the line driving power capabilities of the anticoincident circuit 53.

If a pulse representing a gamma ray of capture energy of 6.5+ is received at amplifier circuit 41 instead of the pulse representing 6 mev. as described above, the pulse energy passes through discriminator circuits 43 and 59 as described and also through discriminator circuit 45. Pulse shaping circuit 55 operating generally as circuit 49 produces a positive going pulse approximately 10 volts in amplitude but approximately 25 microseconds in width due to the value of resistor 149 and capacitor 151. After passing through emitter follower transistor 153 the positive pulse is applied to the base of transistor 145. This pulse turns off 145 thereby preventing the passage of the latter arriving negative pulse from delay line 141. In view of the cut-off action imposed by discriminator circuit 55 and since pulses representing energy less than 5 mev. will not overcome the threshold bias of either 43 or 45, it is clear that only energy within the 5 to 6.5 mev. range can be passed to output 65 as a 2 volt negative going pulse. Of course, by varying 91, 93 and 67, the range can be varied as desired. The threshold voltage on transistor 107 allows all pulses representing energy of 2 mev. or over to pass to line 63 as a one volt negative pulse from transistor 121.

If a 2 volt negative going pulse from line 65 is produced along with a one volt negative going pulse from line 63, the impedance matching characteristics of conductor 35 system are such that larger 2 volt pulse will always dominate the smaller pulse allowing only the larger pulse to travel uphole.

Although only the preferred embodiments have been described in detail, numerous other modifications can be made in accordance with the spirit of this invention. Therefore, it should be understood that this invention is not limited to the specifically disclosed methods and apparatus but is only limited in accordance with the appended claims.

What is claimed is:

1. A downhole pulse height analyzing circuit adapted for logging operations wherein a portion of a prompt capture gamma ray spectrum most sensitive to chlorine and a portion of the spectrum dependent on hydrogen content are scanned simultaneously comprising,
   (a) a first chlorine signal discriminator means for passing all signals representing energy above 5.0 million electron volts,
   (b) a second chlorine signal discriminator means for passing all signals representing energy above 6.5 million electron volts,
   (c) an anticoincident circuit means connecting said first and said second chlorine signal discriminator means in parallel,
   (d) a neutron signal discriminator means for passing all signals representing at least a portion of the energy spectrum above 2.0 million electron volts, and
   (e) an amplifying means, said means connected to the inputs of said first and said second chlorine signal discriminator means and to the input of said neutron signal discriminator means.

2. In a downhole pulse height analyzing circuit as set forth in claim 1 wherein an output circuit connects the anticoincident circuit means and the neutron signal discriminator means in parallel.

3. In a downhole pulse analyzing circuit as set forth in claim 1 wherein a bias means for establishing a predetermined threshold voltage and a second means for establishing a second predetermined threshold voltage, said second means including said bias means and a signal attenuating means, determine signal amplitude limits passed by the first and second chlorine signal discriminator means.

4. A downhole pulse height analyzing circuit adapted for logging operations wherein a portion of a prompt capture gamma ray spectrum most sensitive to chlorine and a portion of the spectrum dependent upon hydrogen content are scanned simultaneously comprising,
   (a) a chlorine signal discriminator section including,
      (1) a first discriminator means,
      (2) a second discriminator means, (3) a bias source coupled in parallel to said first and second discriminator means,
(4) an anticoincident circuit,
(5) a pulse shaping circuit coupled between said first discriminator means and said anticoincident circuit,
(6) a second pulse shaping circuit, and
(7) a delay line, said second pulse shaping circuit and said delay line serially coupled between said second discriminator means and said anticoincident circuit, (b) a neutron signal discriminator section including,
(1) an amplifier,
(2) a third discriminator means, and
(3) a third pulse shaping circuit, said third discriminator means coupled between said amplifier and said third pulse shaping circuit, and, (c) an amplifying means including an input circuit and two output circuits, one of said output circuits connected in parallel to said first and said second discriminator means and the second of said output circuits connected to said neutron signal discriminator section.

5. In a downhole pulse height analyzing circuit as set forth in claim 4 wherein the anticoincident circuit and the third pulse shaping circuit are coupled in parallel.

6. In a downhole pulse height analyzing circuit as set forth in claim 4 wherein each discriminator means includes a back biased transistorized amplifier stage with negative feedback.

7. In a downhole pulse height analyzing circuit as set forth in claim 6 wherein the bias source coupled to the first and second discriminator means includes a Zener diode.

8. An improved method for conducting chlorine logging operations whereby salt water can be distinguished from oil deposits under varying conditions comprising,
(a) irradiating a subsurface formation with fast neutrons,
(b) detecting the prompt capture gamma rays emitted by said formation in response to said neutrons, and
(c) recording only said gamma rays which have energies within the critical range from 5.0 to 6.5 mev. as indicative of chlorine.

9. An improved method for conducting chlorine logging operations whereby salt water can be distinguished from oil deposits under varying conditions comprising,
(a) irradiating a subsurface formation with fast neutrons,
(b) detecting the prompt capture gamma rays emitted by said formation in response to said neutrons,
(c) analyzing the energy spectrum of said gamma rays to determine pulses within the interval of about 5.0 to 6.5 mev.,
(d) transmitting said pulses uphole, and
(e) recording said pulses as the exclusive indication of chlorine in said formation.

References Cited

UNITED STATES PATENTS

| | | | |
|---|---|---|---|
| Re. 24,383 | 10/1957 | McKay | 250—71.5 |
| 2,905,826 | 9/1959 | Bonner et al. | 250—83.6 |
| 3,090,867 | 5/1963 | Swanson et al. | 250—83.6 |

ARCHIE R. BORCHELT, *Primary Examiner.*

RALPH G. NILSON, *Examiner.*